Patented Nov. 25, 1952

2,619,480

UNITED STATES PATENT OFFICE 2,619,480

MELAMINE-FORMALDEHYDE RESINOUS COMPOSITION CONTAINING ACETYL BENZAMIDE

Richard Lindenfelser, Darien, and Martha Kilthau, Stamford, Conn., assignors to American Cyanamid Company, New York, N. Y., a corporation of Maine No Drawing. Application September 15, 1951, Serial No. 246,876

9 Claims. (Cl. 260—67.6)

This invention relates to a resinous composition and, more particularly, to melamine resins containing as a latent catalyst therefor acetylbenzamide.

The principal object of the present invention is to produce a resinous material containing, as a latent catalyst, acetylbenzamide. A further object of the present invention is to produce clear, molded articles from resinous molding compositions comprising melamine-formaldehyde resins and, as a latent catalyst therefor, acetylbenzamide. These and other objects of the present invention will be discussed more fully hereinbelow.

In preparing resinous compositions, particularly melamine-formaldehyde resins for use as molding compositions, it is desired oftentimes to use a latent catalyst in the resin. The addition of conventional catalysts to the reaction in a kettle will generally cause a premature gelation of the resin syrup in the kettle. A conventional catalyst, added at any point in the resin preparation or subsequent treatment, i. e. added to the reactants in the kettle, or blended with resin later, will cause cloudy moldings and/or poor storage stability. Many of the conventional latent catalysts are liquid in form and when they are added to the dry molding powder it is only with difficulty that they are dispersed throughout the powder so as to make a composition with uniform properties. The use of the latent catalyst of the present invention in the place of conventional catalysts avoids these shortcomings.

In the preparation of the compositions of the present invention, one may use melamine-formaldehyde resins in which the mol ratio of melamine to formaldehyde is within the range of 1:1 to 1:6, respectively. It is preferred, however, for most molding operations that the mol ratio of melamine to formaldehyde be within the range of 1:1.5–1:3, respectively.

The latent catalyst used in the composition of the present invention is the reaction product of benzamide with acetic anhydride and may be prepared according to the following example.

PROCESS FOR THE PREPARATION OF ACETYLBENZAMIDE

Equal parts by weight of benzamide and acetic anhydride are heated together at 140–150° C. for ½ hour and the reaction mixture is then neutralized with sodium hydroxide or potassium carbonate solution. The resultant oily layer is separated from the aqueous layer, allowed to crystallize and purified by decoloring with activated carbon and recrystallizing from an alcohol-water solvent. The product is in the form of white, needle-like crystals, melting at 115–116° C., soluble in ethanol and insoluble in water. The empirical formula of the product, calculated from analytical data, is found to be C9H9O2N, which is in accordance with the formula of acetylbenzamide,

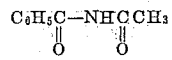

The acetylbenzamide is incorporated into the resin most satisfactorily by means of the dry blending process, but may also be added during the kettle concentration stage of the resin preparation. At the temperatures reached in the dry blending process, or during the kettle concentration of melamine-formaldehyde syrups, the acetylbenzamide catalyst does not affect the reaction rate appreciably, so that these operations may be carried out in the usual manner. However, at the higher temperatures employed in molding, the catalytic action becomes quite evident. The cure time of acetylbenzamide-catalyzed melamine resin is reduced as much as 400–500%, in comparison with uncatalyzed melamine-formaldehyde resins. A further advantage resides in the fact that acetylbenzamide is completely compatible with melamine resins and does not affect the clarity of clear resin moldings. By decreasing the cure time, production rates of molded pieces may be effectively increased. Because of its ability to produce clear moldings, acetylbenzamide offers an advantage over certain other catalysts in current use which tend to give increased opacity in the molded pieces.

In the following examples, all parts are parts by weight. These examples are set forth solely for the purpose of illustration and specific enumeration of detail contained therein should not be interpreted as limitations on the case, except as indicated in the appended claims.

Example 1

A spray-dried melamine resin having a ratio of 2 mols formaldehyde per mol of melamine is blended with 0.4% zinc stearate and 0.5% acetylbenzamide and milled on heated differential rolls at 135–150° C. for about 18–20 minutes, until a well-densified sheet, having the proper plasticity for molding, is obtained. A cure time of about 6 minutes produces moldings with a water absorption of 0.20% after 30 minutes in boiling water. In comparison, the same resin prepared without the addition of a catalyst has to be cured approximately 30 minutes to achieve the same low water absorption figure.

Example 2

A melamine resin syrup having a ratio of 2 mols formaldehyde per mol of melamine is prepared in the conventional manner and concentrated in a resin kettle to 89° C. under a vacuum of 52 cm. mercury. At this point, 1.5 parts of acetylbenzamide in a 20% n-propanol solution neutralized with sodium hydroxide to pH 8.1 (glass electrode) are added to the syrup containing 100 parts of resin solids. The dehydration of the resin syrup is then completed in the usual manner and the resin is removed from the kettle at about 96° C. A clear, dry, brittle resin is obtained which can be tray-dried and molded to give strong water-resistant pieces. The resin, kettle-dehydrated with acetylbenzamide as catalyst, benefits from the latent catalytic action of the acetylbenzamide, since resin syrups prepared similarly with a sufficient amount of an ordinary catalyst to give the same rate of cure as 1.5% acetylbenzamide will tend to gel the resin in the kettle at temperatures and solids contents which are too low to obtain a brittle, stable resin.

In preparing the compositions of the present invention, the acetylbenzamide should be added in conventional catalytic amounts. One may use as little as 0.01% by weight based on the total weight of the resin solids and as much as 5.0% by weight of the catalyst, based on the weight of the resin solids. Even greater amounts than 5% may be used, but no material advantage is to be gained thereby. It is, in fact, preferred that the amount of latent catalyst used be in the order of about 0.5–1.5% by weight of acetylbenzamide, based on the weight of the melamine resin solids.

Obviously, one may make use of other modifiers which are well known in the art, such as the incorporation into the molding compositions of such materials as lubricants, pigments, plasticizers and fillers, such as wood flour, asbestos, and the like.

We claim:

1. A composition comprising a melamine-formaldehyde resin and, as a latent catalyst therefor, acetylbenzamide.

2. A composition comprising a melamine-formaldehyde resin and, as a latent catalyst therefor, 0.01–5.0% by weight of acetylbenzamide.

3. A composition comprising a melamine-formaldehyde resin and, as a latent catalyst therefor, 0.5–1.5% by weight of acetylbenzamide.

4. A composition comprising a melamine-formaldehyde resin and, as a latent catalyst therefor, acetylbenzamide, wherein the mol ratio of the melamine to formaldehyde is within the range of 1:1–1:6, respectively.

5. A composition comprising a melamine-formaldehyde resin and, as a latent catalyst therefor, 0.01–5.0% by weight of acetylbenzamide, wherein the mol ratio of the melamine to formaldehyde is within the range of 1:1–1:6, respectively.

6. A composition comprising a melamine-formaldehyde resin and, as a latent catalyst therefor, 0.5–1.5% by weight of acetylbenzamide, wherein the mol ratio of the melamine to formaldehyde is within the range of 1:1–1:6, respectively.

7. A composition comprising a melamine-formaldehyde resin and, as a latent catalyst therefor, acetylbenzamide, wherein the mol ratio of the melamine to formaldehyde is within the range of 1:1.5 to 1:3, respectively.

8. A composition comprising a melamine-formaldehyde resin and, as a latent catalyst therefor, 0.01–5.0% by weight of acetylbenzamide, wherein the mol ratio of the melamine to formaldehyde is within the range of 1:1.5 to 1:3, respectively.

9. A composition comprising a melamine-formaldehyde resin and, as a latent catalyst therefor, 0.5–1.5% by weight of acetylbenzamide, wherein the mol ratio of the melamine to formaldehyde is within the range of 1:1.5 to 1:3, respectively.

RICHARD LINDENFELSER.
MARTHA KILTHAU.

REFERENCES CITED

The following references are of record in the file of this patent:

UNITED STATES PATENTS

| Number | Name | Date |
|---|---|---|
| 2,376,725 | Jayne | Aug. 10, 1943 |
| 2,539,349 | Detwiler | July 3, 1951 |